US007685365B2

(12) United States Patent
Rajwar et al.

(10) Patent No.: US 7,685,365 B2
(45) Date of Patent: Mar. 23, 2010

(54) TRANSACTIONAL MEMORY EXECUTION UTILIZING VIRTUAL MEMORY

(75) Inventors: Ravi Rajwar, Portland, OR (US); Maurice P. Herlihy, Brookline, MA (US)

(73) Assignee: Intel Corporation, Santa Clara, CA (US)

( * ) Notice: Subject to any disclaimer, the term of this patent is extended or adjusted under 35 U.S.C. 154(b) by 382 days.

(21) Appl. No.: 10/956,178

(22) Filed: Sep. 30, 2004

(65) Prior Publication Data

US 2006/0085588 A1     Apr. 20, 2006

(51) Int. Cl.
G06F 12/00     (2006.01)
G06F 13/00     (2006.01)
G06F 13/28     (2006.01)

(52) U.S. Cl. .................................................. 711/118
(58) Field of Classification Search ................ 711/100, 711/118
See application file for complete search history.

(56) References Cited

U.S. PATENT DOCUMENTS

| | | | | |
|---|---|---|---|---|
| 4,819,154 A | * | 4/1989 | Stiffler et al. ................. | 714/20 |
| 4,926,317 A | * | 5/1990 | Wallach et al. ................ | 711/3 |
| 5,107,457 A | * | 4/1992 | Hayes et al. ................ | 711/132 |
| 5,133,058 A | * | 7/1992 | Jensen ........................ | 711/207 |
| 5,428,761 A | * | 6/1995 | Herlihy et al. .............. | 711/130 |
| 5,566,324 A | * | 10/1996 | Kass ........................... | 711/160 |
| 5,619,673 A | * | 4/1997 | Wang .......................... | 711/207 |
| 5,742,933 A | * | 4/1998 | Kojima et al. ............... | 711/113 |
| 6,295,579 B1 | * | 9/2001 | Sukegawa et al. ........... | 711/119 |
| 6,799,253 B1 | * | 9/2004 | Peterson ..................... | 711/150 |
| 2006/0085591 A1 | * | 4/2006 | Kumar et al. ............... | 711/113 |

OTHER PUBLICATIONS

Herlihy, M., "Software Transactional Memory for Dynamic-Sized Data Structures", *Principals of Distributed Computing*, Sun Microsystems, ISBN 1-58113-661-7/03/0006 (Jul. 2003). Boston, MA.
Herlihy, M. "Transactional Memory: Architectural Support for Lock-Free Data Structures", *Proceedings of the Twentieth Annual International Symposium on Computer Architecture*(1993).
Martinez, J., "Speculative Synchronization: Applying Thread-Level Speculation to Explicitly Parallel Applications" ASPLOS X, ISBN 1-58113-574-2/02/00100 (Oct. 2002), ACM, San Jose, CA.
Rajwar, R., "Transactional Execution Toward Reliable, High-Performance Multithreading" IEEE Micro, pp. 117-125, IEE computer society (Nov. 2003).

(Continued)

*Primary Examiner*—Sheng-Jen Tsai
(74) *Attorney, Agent, or Firm*—David P. McAbee (57) ABSTRACT

Embodiments of the invention relate to transactional memory execution utilizing virtual memory. A processor includes a local transactional cache and a resource manager. The resource manager responsive to a transactional memory transaction request from a requesting thread determines whether the local transactional cache is capable of accommodating the transactional memory transaction request and, if so, the local transactional caches performs the transactional memory transaction. However, if the local transactional cache is not capable of accommodating the transactional memory transaction request, data for the transactional memory transaction request is overflowed into an application's virtual address space associated with the requesting thread.

32 Claims, 6 Drawing Sheets

OTHER PUBLICATIONS

Rajwar, R., "Transactional Lock-Free Execution of Lock-Based Programs", ASPLOS X, ISBN 1-58113-574-2/02/00100 (Oct. 2002), ACM, San Jose, CA.

European Patent Application No. 05255806.1 Office Action mailed Nov. 27, 2008.

S. Lie et al., "Hardware Support for Unbounded Transactional Memory", Thesis at the Massachusetts Institute of Technology, May 7, 2004.

M. Herlihy et al., "Transactional Memory: Architectural Support for Lock-Free Data Structures", Proceedings of the Annual International Symposium on Computer Architecture, May 16-19, 1993.

Extended European Search Report for corresponding matter P29169EP mailed Feb. 29, 2008.

Lie S: "Hardware Support for Unbounded Transactional Memory" Thesis at the Massachusetts Institute of Technology, May 7, 2004, pp. 1, 3, 7-8, 39-66.

Herlihy et al. "Transactional Memory: Architectural Support for Lock-Free Data Structure" Proceedings of the Annual International Symposium on Computer Architecture.

San Diego, May 16-19, 1993, pp. 289-300.

European Search Report, Application No. 05255806.1, Mailed Feb. 29, 2008.

\* cited by examiner

TRANSACTIONAL MEMORY EXECUTION UTILIZING VIRTUAL MEMORY

BACKGROUND

1. Field

Embodiments of the invention relate to the field of transactional memory and transactional execution. More particularly, embodiments of the invention relate to enabling transactional memory execution utilizing virtual memory with and without hardware support.

2. Description of Related Art

Transactional memory execution allows applications, programs, modules, etc., and more particularly, application program interfaces (APIs), to access a database file or another type of memory file in an atomic manner. For example, transactional memory may be used a part of a run-time engine for managing persistent, pointer-rich data structures, such as databases, and directory services.

An API may be thought of as a language or message format used by an application, program, module, etc., to communicate with a system program such as an operating system or a database management system (DBMS). APIs may be implemented by writing function calls in a program, which provide the linkage to a specific sub-routine for execution.

Transactional memory makes it easier to write parallel programs and the use of transactional memory allows for different threads to be processed simultaneously thereby gaining extremely high processing efficiencies.

Transactional memory is typically thought of as being derived from database transactions. Generally, a transaction is a group of operations that must satisfy four properties referred to as ACID properties (atomicity, consistency, isolation, and durability). The first ACID property is atomicity. Atomicity requires that a transaction is performed in all-or-nothing manner. The transaction may be aborted either because the program aborts or due to an error. Atomicity requires that either all of the operations of the transaction be performed or none of them be performed. The second ACID property is consistency. Consistency requires that if the database is in a consistent state before the transaction is performed, the database should be left in a consistent state. The third ACID property is isolation. The isolation property states that all transactions performed have to appear to be done in some sort of serial order (i.e. they should be serializable). The last and fourth property required to be under ACID is durability. Durability requires a transaction to survive a machine crash. That is, a transaction has to be written to a stable storage device (e.g. a disk) before it can be committed.

Transactional memory and transactional execution allow a multi-threaded application to be written in a robust and high-performance manner. This becomes more important as computer systems, such as desktops and servers, are increasingly being required to operate in heavily-threaded environments. Particularly, the speculative execution support of modern processors can be utilized to execute blocks of code speculatively to implement these multi-threaded applications efficiently. However, present techniques that implement transactional memory and transactional execution suffer from resource limitations in that they cannot handle arbitrary sized transactions or transactions of arbitrary lengths thereby placing tremendous constraints on both programming and transactional execution.

DETAILED DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth to provide a thorough understanding of the embodiments of the invention, it will be apparent to one skilled in the art that these specific details are not required to practice the embodiments of the invention. In other instances details such as, well-known methods, types of data, protocols, procedures, components, electrical structures and circuits, are not described in detail, or are shown in block diagram form, to avoid obscuring the invention. Furthermore, embodiments of the invention will be described in particular embodiments but may be implemented in hardware, software, firmware, middleware, or a combination thereof.

Figure 1:
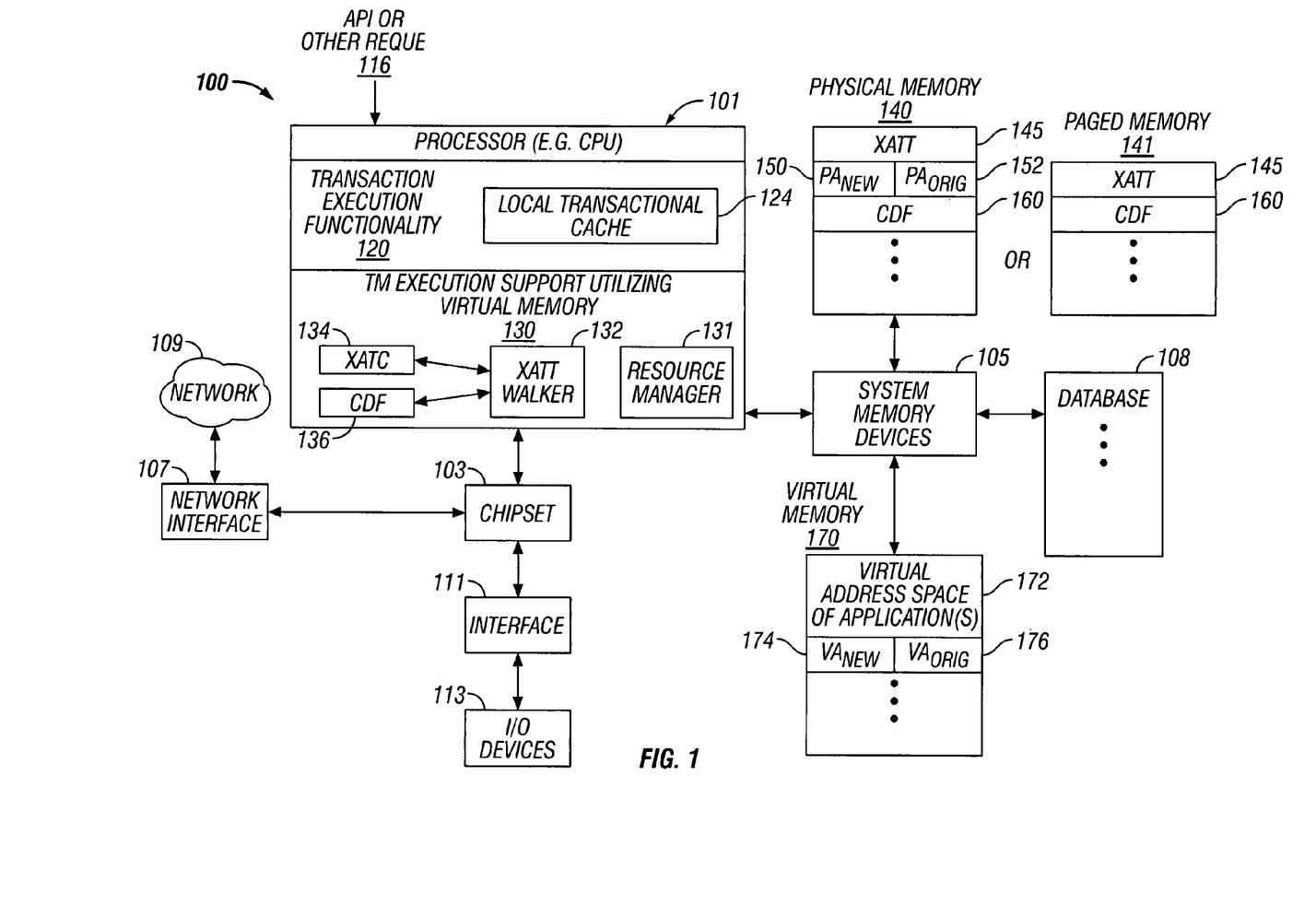
FIG. 1 shows a partial block diagram of an example of a computer system configuration, in which embodiments of the invention may be practiced.

FIG. 1 shows a partial block diagram of an example of a computer system configuration, in which embodiments of the invention may be practiced. The system configuration 100 includes at least one processor 101 such as a central processing unit (CPU), a chipset 103, system memory devices 105, one or more interfaces 111 to interface with one or more input/output (I/O) devices 113, and a network interface 107.

The chipset 103 may include a memory control hub (MCH) and/or an I/O control hub. The chipset 103 may be one or more integrated circuit chips that act as a hub or core for data transfer between the processor 101 and other components of the computer system 100. Further, the computer system 100 may include additional components (not shown) such as other processors (e.g. in a multi-processor system), a co-processor, as well as other components, etc.—this being only a very basic example of a computer system.

For the purposes of the present description, the term "processor" or "CPU" refers to any machine that is capable of executing a sequence of instructions and should be taken to include, but not be limited to, general purpose microprocessors, special purpose microprocessors, application specific integrated circuits (ASICs), multi-media controllers, signal processors, and micro-controllers, etc. In one embodiment, the CPU 101 is a general-purpose high-speed microprocessor that is capable of executing an Intel Architecture instruction set. For example, the CPU 101 can be one of the INTEL® PENTIUM® classes of processors, such as INTEL® Architecture 32-bit (IA-32) processor (e.g. PENTIUM® 4M).

The CPU 101, the chipset 103, and the other components access system memory devices 105 via chipset 103. The chipset 103, for example, with the use of a memory control hub, may service memory transactions that target system memory devices 105.

System memory devices 105 may include any memory device adapted to store digital information, such as static random access memory (SRAM), dynamic random access memory (DRAM), synchronous dynamic random access memory (SDRAM), and/or double data rate (DDR) SDRAM or DRAM, etc. Thus, in one embodiment, system memory devices 105 include volatile memory. Further, system memory devices can also include non-volatile memory such as read-only memory (ROM).

Moreover, system memory devices 105 may further include other storage devices such as hard disk drives, floppy disk drives, optical disk drives, etc., and appropriate interfaces.

Embodiments of the invention provide enhanced transactional memory execution support in processors by utilizing virtual memory to allow for arbitrary sized transactions in terms of resources, such as data footprint size, instructions executed, process migration, etc. Further, this is done transparently such that a programmer does not have to write software in any special manner to accommodate resource issues. Hereinafter, the term transaction refers to a sequence of instructions that are executed atomically. Moreover, a transaction may also comply with the ACID properties previously discussed.

As will be discussed, embodiments of the invention relate to transactional memory execution support utilizing virtual memory to effectively accommodate resource issues in transactional memory execution by utilizing an application's virtual address space itself, to overflow any data that cannot be buffered in transactional cache structures of the processor. This allows for hardware or processor transactional execution support for the majority of the common cases where the resource requirements of a transaction can be accommodated by the local transaction cache, and in the relatively uncommon but critically important case where the data footprint size is larger than the local transaction cache, the data is overflowed into the application's own virtual address space for processing. The existing local cache in a processor may also be used as a transactional cache or a transactional cache can be a separate hardware structure.

Additionally, system memory devices 105 may in non-volatile memory store a program to aid in transactional memory (TM) execution utilizing virtual memory as implemented by processor 101 to implement techniques in accordance with embodiments of the invention. Particularly, such a program, in one embodiment may aid in enabling transactional memory accesses within computer system 100 and particularly between the transactional cache 124 of the processor, physical memory 140 or paged memory 141, virtual memory 170, and databases 108, as will be discussed.

System memory devices 105 in conjunction with physical memory 140, paged memory 141, virtual memory 170, etc., may also be utilized to implement memory transactions with databases 108. For example, databases 108 may include such databases as corporate databases, financial databases, project management databases, directory services, etc., and other pointer-rich data structures that are typically used with transactional memory type transactions.

Further, computer system 100 may include suitable interfaces 111 to interface with I/O devices 113 such as disk drives, monitors, keypads, a modem, a printer, or any other type of suitable I/O device.

Computer system 100 may include a network interface 107 to interface the computer system 100 with a network 109 such as a local area network (LAN), a wide area network (WAN), the Internet, etc.

The basic computer system configuration 100 of FIG. 1 is an example of one type of computer system that may be utilized in implementing transactional memory execution utilizing virtual memory, as will be hereinafter discussed. It should be appreciated by those skilled in the art that the exemplary FIG. 1 computer system configuration 100 is only one example of a basic computer system and that many other types and variations are possible. Further, those skilled in the art will recognize that the exemplary environment illustrated in FIG. 1 is not intended to limit the embodiments of the invention. Moreover, it should be appreciated that in addition to, or in lieu of, the single computer system configuration 100, clusters or other groups of computers (similar to or different from computer system configuration 100) may be utilized in practicing embodiments of the invention.

More particularly, as shown in FIG. 1, processor 101 may implement transactional memory (TM) execution utilizing virtual memory functionality 130 by utilizing a transaction address translation table walker (hereinafter XATT walker) 132 in conjunction with standard transaction execution functionality 120 and local transactional cache 124 and transaction address tables 145 (hereinafter XATTs) stored in physical and paged memory 140 and 141, as well as virtual memory 170, as will be discussed. Further, as will be discussed in more detail later, TM execution utilizing virtual memory 130 may also implement a transaction address translation cache (hereinafter XATC) 134 and a conflict detection filter (hereinafter CDF) 136.

Processor 101 may utilize standard transaction execution functionality 120 operating with local transactional cache 124 to implement standard transactional execution functionality when the resource requirements can be met by local transactional cache 124 for the requested transaction. But in other cases, when the transaction requires data resources that are larger than the local transactional cache or experiences an event such as context switches that require persistence beyond the local transactional cache, the data may be overflowed into the virtual address space of the corresponding application 172 to seamlessly perform transactional memory execution utilizing virtual memory 170. This is accomplished, as will be discussed, by the combination of the transaction address translation table (XATT) walker 132, a transaction address translation table (XATT) 145, and a unique and non-obvious combination of the use of virtual memory 170 and physical memory 140.

In one embodiment, processor 101 includes a local transactional cache 124 and a resource manager 131. The resource manager 131 responsive to a transactional memory transaction request 116 from a requesting thread determines whether the local transactional cache is capable of accommodating the transactional memory transaction request and, if so, the local transactional caches performs the transactional memory transaction. However, if the local transactional cache 124 is not capable of accommodating the transactional memory transaction request, data for the transactional memory transaction request is overflowed into an application's virtual address space 170 associated with the requesting thread.

As shown in FIG. 1, the computer system configuration 100 includes physical memory 140 having a XATT 145, a new physical address ($PA_{new}$) 150, and an original physical address ($PA_{orig}$) 152. In a paged memory embodiment 141 a XATT 145 may also be used. The computer system configuration 100 also includes virtual memory 170 to implement a virtual address space 172 for an application and the virtual address space 170 includes a new virtual address ($VA_{new}$) 174 and an original virtual address ($VA_{orig}$) 176, as will be discussed.

Particularly, based on an API request or other type of program or module request 116 (i.e. some sort of thread requesting a transactional memory transaction), the processor 101 performs transactional memory execution potentially utilizing virtual memory to implement the transactional memory transaction as will be discussed hereinafter. For example, this may be done to simply update memory for a currently active thread of a program in a transactional manner or may ultimately update a database 108 in a transactional manner.

Figure 2:
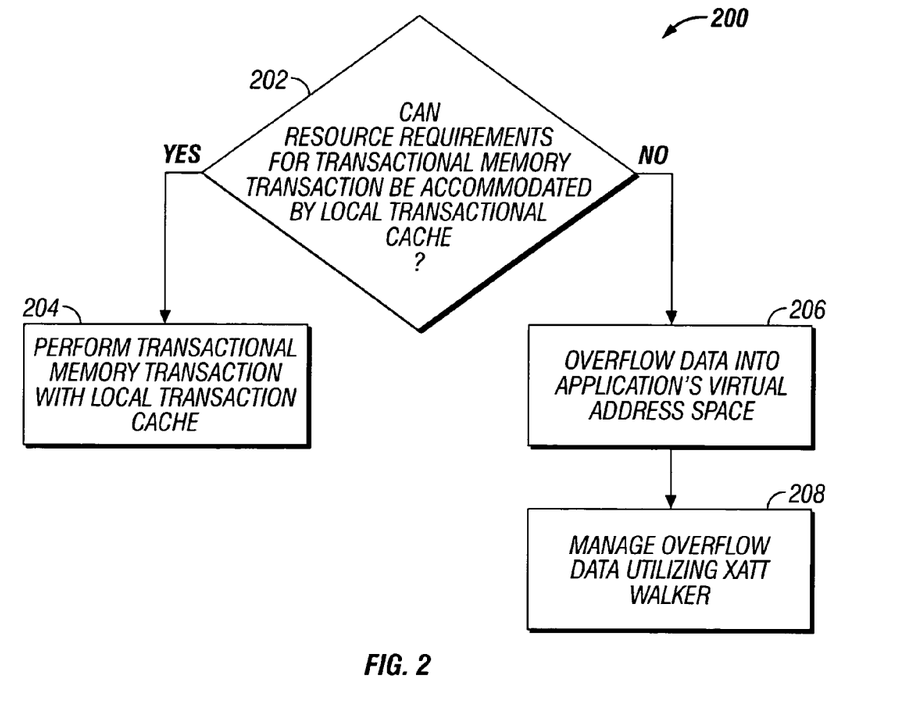
FIG. 2 is a flow diagram illustrating a process to implement embodiments of the invention related to transactional memory execution utilizing virtual memory.

Turning now to FIG. 2, FIG. 2 is a flow diagram illustrating a process 200 to implement embodiments of the invention related to transactional memory execution utilizing virtual memory. At block 202, based upon a transactional memory transaction request from a requesting thread, the process 200 determines whether the resource requirements of the requested transaction can be accommodated by the local transactional cache 124 of the processor. For example, resource manager 131 may make this determination. If so, processor 101 utilizing transaction execution functionality 120 and local transactional cache 124 performs the transactional memory transaction utilizing the local transactional cache 124 for the requesting threads (block 204). If not, data for the requested transactional memory transaction for the requesting thread is overflowed into the requesting application's virtual address space 172 (block 206). This data overflow is managed utilizing the XATT walker 132 (block 208). As will be discussed in more detail later, by utilizing the virtual address space of the application 172 the transactional memory transaction can still be processed.

Thus, standard transaction execution functionality is utilized to support the common case where the resource requirements of a requested transaction from a thread of an application can be accommodated by the local transactional cache 124.

However, when the data resource required is larger than that of the local transactional cache 124, the data is overflowed into the application's own virtual address space 172 in virtual memory 170 using a copy-on-write technique. By keeping the overflow information in the same virtual address space as the application, critical situations such as context switches, process migrations, etc. may be handled automatically. Advantageously, the user is not involved in this process. As will be discussed, the XATT walker 132, similar to a page walker, provides a mechanism by which the transactional memory transaction can be accomplished utilizing virtual memory instead of the local transactional cache.

Two particular components are utilized for dealing with these overflows: the XATT 145 stored in physical memory 140 or paged memory 141 and the XATT walker 132 implemented by the processor. The XATT 145 is operated upon by the XATT walker 132 to accomplish this functionality. The XATT is managed similar to the way a page table is managed and the XATT walker 132 is implemented in similar fashion to a page walker, as will be discussed. It should be appreciated that although the XATT walker 132 is shown as being implemented by the processor 101, it may also be implemented in a hybrid manner with software support as well.

Figure 3:
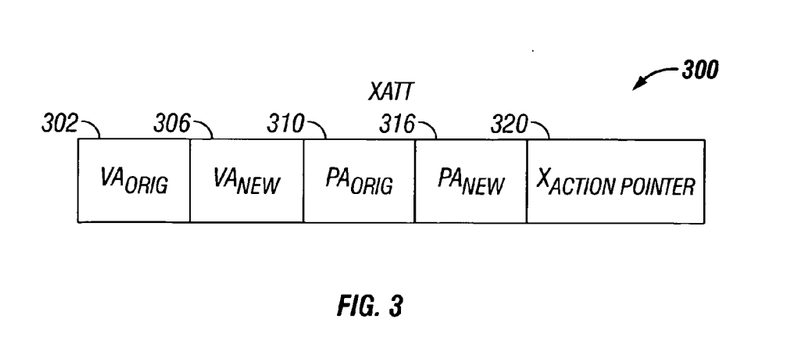
FIG. 3 is a diagram of the structure of the transaction address translation table (XATT), according to one embodiment of the invention.

With reference now to FIG. 3, FIG. 3 is a diagram of the structure of the XATT 300, according to one embodiment of the invention. As previously discussed, the XATT may be stored in physical memory or page memory. Further, the XATT 300 may be common to all transactions running within the address base of the application under consideration, or may be per-transaction.

Particularly, the XATT includes 5 fields: the original virtual address ($VA_{orig}$) 302, a new virtual address ($VA_{new}$) 306, the original physical address ($PA_{orig}$) 310, the new physical address ($PA_{new}$) 316, and a transaction pointer (XPTR) 320. The XATT 300 performs two main functions: 1) to keep track of overflowed read sets (e.g. blocks read in the transactions); and 2) to keep track of overflowed write sets (e.g. blocks written in the transactions) and their translated addresses. It should be appreciated that XATT 300 may be a single unitary structure or may be broken up into separate structures. The XATT may itself be used to store the data corresponding to the translated address.

Figure 4:
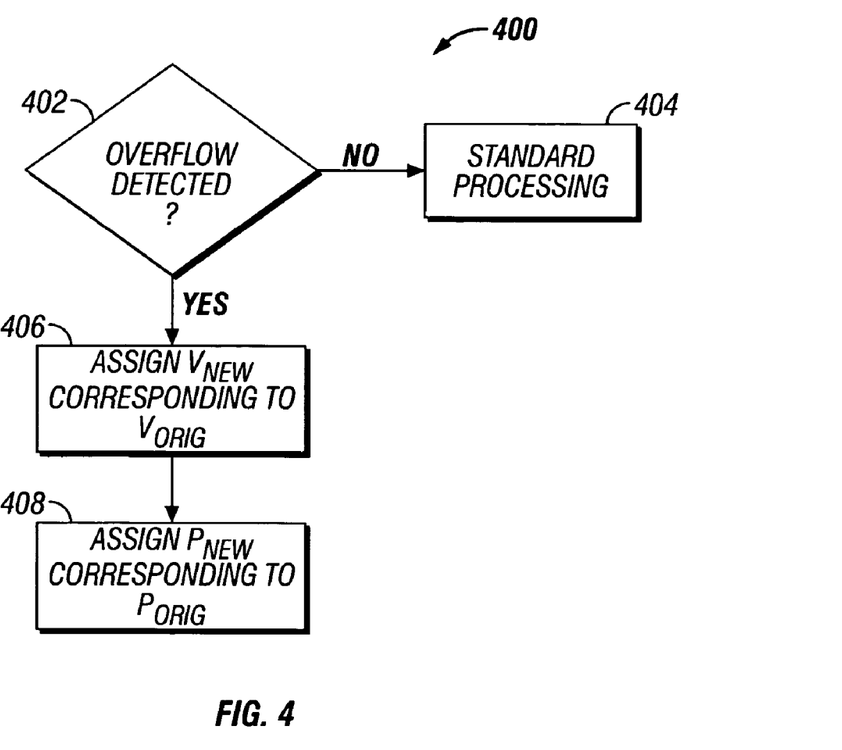
FIG. 4 is a flow diagram illustrating a process to obtain new virtual and physical addresses, according to one embodiment of the invention.

Turning now to FIG. 4, FIG. 4 illustrates a process 400 to obtain new virtual and physical addresses, according to one embodiment of the invention. The original virtual address ($VA_{orig}$) is typically a cache-block-aligned address of the data block that is overflowed. When an overflow is triggered, a new virtual address ($VA_{new}$) is assigned (with its own new physical address ($PA_{new}$)) to correspond to the new virtual address.

Particularly, as shown in FIG. 4, at block 402, the process 400 determines whether an overflow has been detected. If not, standard processing is performed (block 404). However, if an overflow is detected, then a new virtual address ($VA_{new}$) is assigned corresponding to the original virtual address ($VA_{orig}$). Further, at block 408, a new physical address ($PA_{new}$) is assigned corresponding to the original physical address ($PA_{orig}$).

The $VA_{new}$ may be assigned dynamically by the processor, by a run time library, or may be assigned statically at compile time by a compiler, depending upon how the address space implementation is handled by the computer system configuration. The original virtual address ($VA_{orig}$) is obtained using the existing virtual memory management mechanisms. The new virtual address ($VA_{new}$) belongs to the address space of the application itself. The new virtual address may be part of the XATT itself.

These values for the original virtual address ($VA_{orig}$) 302, the new virtual address ($VA_{new}$) 306, the original physical address ($PA_{orig}$) 310, the new physical address ($PA_{new}$) 316, as well as values for the transaction action pointer 320 (as will be discussed in more detail later), may be entered into the XATT 300 and stored in the physical memory 140 and/or paged memory 141.

The XATT 300 may be implemented in two different ways. In one embodiment, the XATT may be implemented on a per transaction basis within the application. When implemented in this manner, each transaction has its own unique new physical address value ($PA_{new}$). This allows a transaction to temporarily update any modifications to overflowed blocks without interfering with any other transactions. The $PA_{new}$ is visible only to the transaction being processed. While this approach allows multiple-copy updates, the original physical address ($PA_{orig}$) needs to be updated with the new physical address value ($PA_{new}$) if the transaction commits. This occurs by the XATT walker 132 triggering the commit transaction.

In another embodiment, XATT 300 may be implemented common to all transactions within the application. In this scheme, the new physical address ($PA_{new}$) is common to all transactions. Thus, no copy-update is necessary to ensure that correct values are visible, since only one physical location can be written to for a given overflow block at any time. Further, all transactions automatically know which physical address to obtain the latest updated data from.

The transaction pointer (XPTR) 320 points to the header data structure of the transaction that currently "owns" a particular overflowed block. Particularly, as will be discussed in more detail, the XPTR 320 may be set to one of the following modes: running, aborted, or committed. The status of a transaction owning the block may be obtained by querying the XPTR. A bulk-squash may be performed if the "status" of the transaction header is set to abort it. Then, the aborter can change the XPTR to point to itself.

Before an overflow transaction commits, it is required to check the XPTR 320 to ensure that it still owns the transaction. If its pointer is set to abort it, the transaction must retry. If it is not aborted, it will automatically set its status to committed. This tells any other thread coming in that the earlier transaction has been committed. Table clean up may occur regularly. Thus, the XPTR 320 provides the ability to atomically commit or abort transactions with overflowed blocks.

Whether a global or private XATT is used, the XPTR 320 always points to a transaction header. The header for each transaction is accessible by the transactional memory machinery. This allows active transactions to abort even swapped out transactions by setting their transaction header status to aborted.

Figure 5:
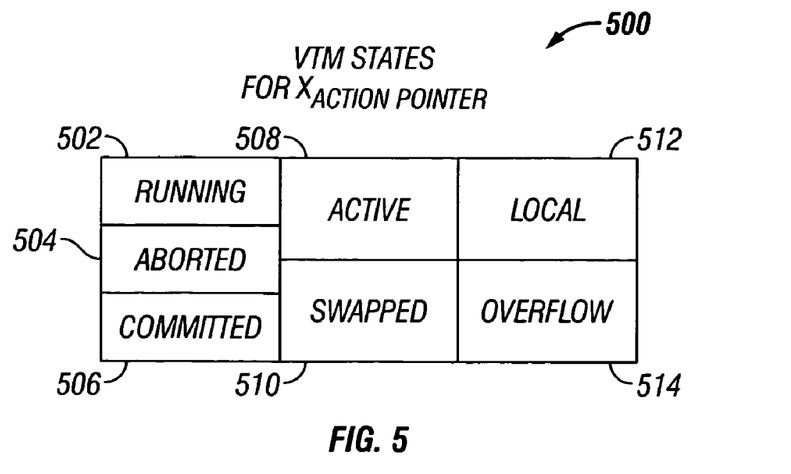
FIG. 5 is a diagram showing an example of the various states that a thread of a transaction may be in while undergoing a transactional memory transaction that utilizes virtual memory, e.g. a virtual transaction memory (VTM) transaction, according to one embodiment of the invention.

With reference now to FIG. 5, FIG. 5 is a diagram showing an example of the various states that a thread of a transaction may be in while undergoing a transactional memory transaction that utilizes virtual memory, e.g. a virtual transaction memory (VTM) transaction, according to one embodiment of the invention. Further, as previously discussed, the VTM state may be stored in the XPTR of the XATT for the transaction.

For example, the VTM state in the XPTR 320 may be set to running 502. The running state refers to a transaction that is executing and whose end-status is not known. On the other hand, the VTM state may be set to aborted 504. If the state is set to aborted it refers to the fact that the transaction was forced to abort. The abort state is necessary because in the overflow case, there is a time period before the transaction finally aborts, because "instantaneous" discards may not be possible.

Alternatively, the VTM state for the XPTR 320 may be set to committed 506. The committed state means that the transaction was successfully executed. The committed state is necessary because in the overflow case, there is a time between which the transaction state has finally been committed, since "instantaneous" updates may not be possible. Further VTM states describe whether the transaction is active 508 or has been swapped 510. The active state 508, denotes that the transaction is currently running on a processor. On the other hand, the swap state 510, denotes that the transaction was context-switched out.

Other VTM states include local 512 or overflowed states 514. The local state 512 refers denotes that the local hardware buffering is sufficient to complete the transaction. On the other hand, the overflowed state 514 denotes that the transaction has run out of local hardware buffering space (e.g. local transaction cache 124) and virtual memory (e.g. virtual memory 170) will be utilized to complete the transactional memory transaction.

Figure 6:
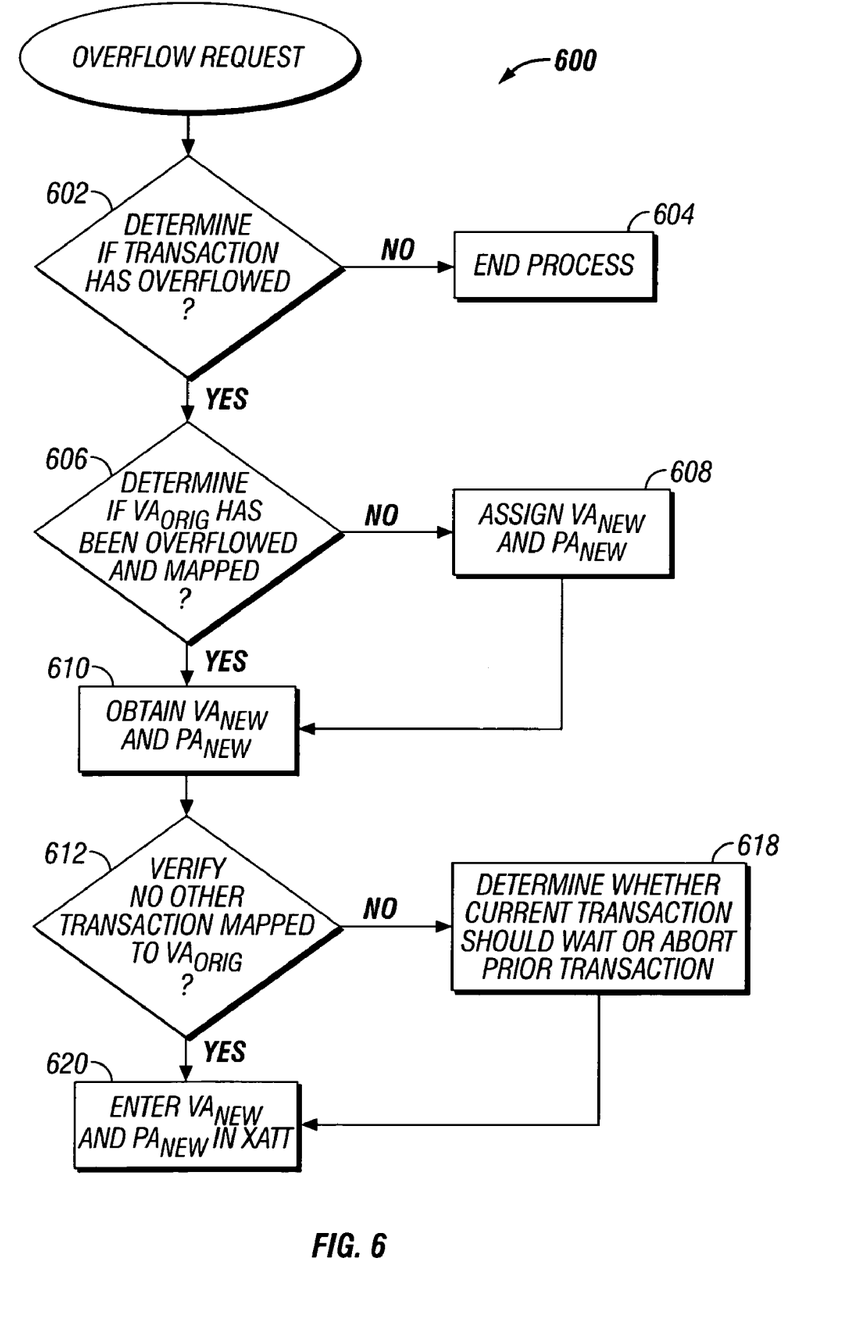
FIG. 6 is a flow diagram illustrating a process of how a transactional memory transaction generates an overflow request, according to one embodiment of the invention.

With reference now to FIG. 6, FIG. 6 is a flow diagram illustrating a process 600 of how a transactional memory transaction generates an overflow request, according to one embodiment of the invention. It should be appreciated that a transaction associated with a thread may generate a request itself or receive a request from another transaction associated with a thread.

To begin with, at block 602, the XATT walker determines if a transaction has overflowed by walking the XATT. As previously discussed, XPTR contains a local or overflow state. If not, at block 604 the process ends. However, if the transaction has overflowed, then the process 600 at block 606 determines if the original virtual address ($VA_{orig}$) has been overflowed and mapped. If not, a new virtual address and new physical address ($VA_{new}$ and $PA_{new}$) is assigned (block 608). The XATT walker walks the XATT table to update it appropriately. In either event, at block 610, the values for $VA_{new}$ and $PA_{new}$ are obtained. Coherency is maintained using $PA_{orig}$. However, the transaction will update $PA_{new}$ when it performs a write. Conflict detection is performed using $PA_{orig}$ since that is the address that all the other transactions know about (assuming unique XATTs are used).

The XATT walker also ensures that no other transaction has mapped to the $VA_{orig}$. This is determined during the XATT walk. If no $VA_{orig}$ entry exists, then a new entry is installed at block 620. Particularly, a $VA_{new}$ and a $PA_{new}$ are entered into the XATT. However, if an original virtual address entry exists, then at block 618 process 600 determines whether the current transaction should wait or whether the prior transaction should be aborted based on the status of XPTR of the XATT. In either event, a $VA_{new}$ and a $PA_{new}$ in the XATT is entered. The XATT walker is responsible for these actions and can do so by directly operating upon the XPTR.

Figure 7:
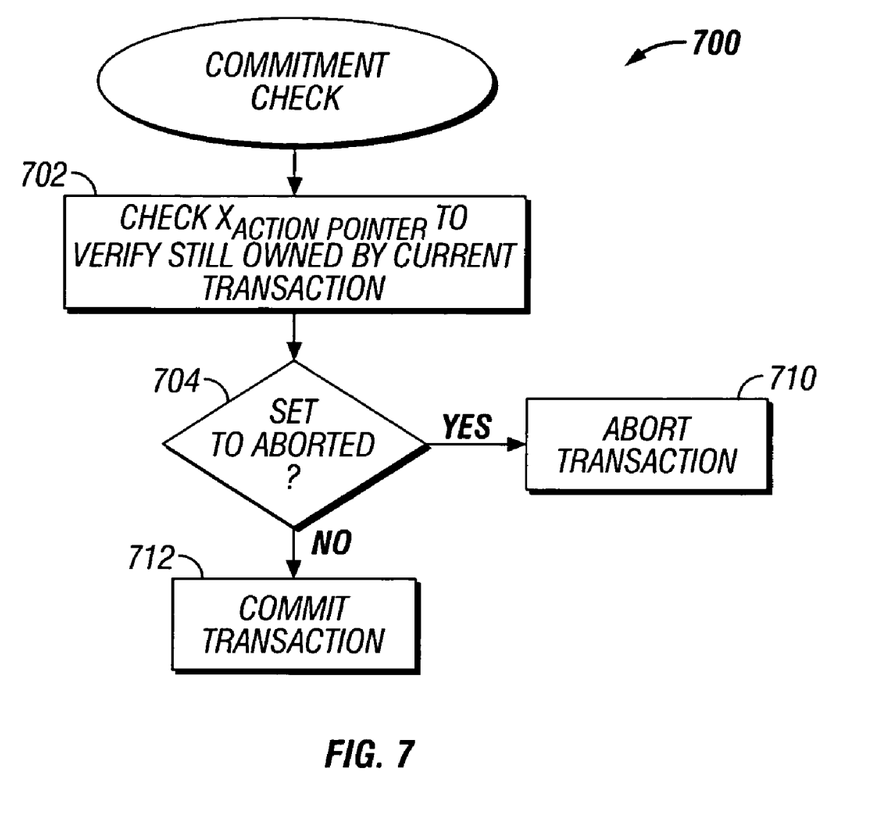
FIG. 7 is a flow diagram illustrating a process to commit a transaction, according to one embodiment of the invention.

Turning now to FIG. 7, FIG. 7 is a flow diagram illustrating a process 700 to commit a transaction, according to one embodiment of the invention. Particularly, before an overflow transaction commits, it should check the XPTR to verify that it is still owned by the current transaction (block 702) (e.g. by checking to see whether it is still active and not swapped). Next, at block 704, the process 700 should check to see if the XPTR is set to "aborted". If it is set to aborted, then at block 710, the transaction is aborted. On the other hand, if the pointer is not set to aborted, then the transaction should atomically be set to committed. Thus, the XPTR provides the ability to atomically commit or abort transactions for overflowed blocks. If the transactional memory transaction is committed, the transactional memory transaction is executed utilizing the applications virtual address space in addition to or in lieu of the local transactional cache.

Figure 8:
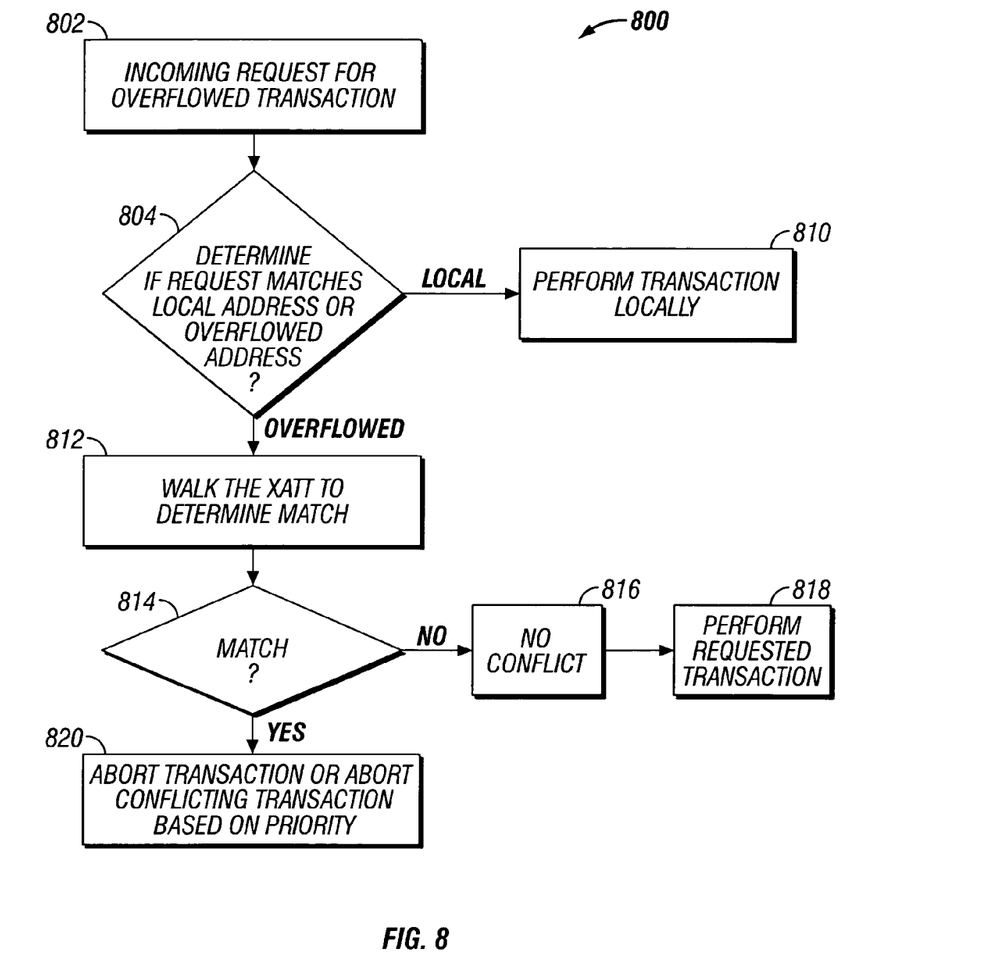
FIG. 8 is a flow diagram illustrating a process of how an overflowed transaction responds to an incoming request, according to one embodiment of the invention.

With reference to FIG. 8, FIG. 8 is a flow diagram illustrating a process 800 of how an overflowed transaction responds to an incoming request, according to one embodiment of the invention. At block 802, an incoming request for an overflow transaction is received. This incoming request may either be generated by another transaction during normal execution or by the XATT walker when a conflict is detected and the overflow transaction has actually committed. Both of these cases require similar action. Thus, dealing with the incoming request being generated by another transaction thread during normal execution, when an incoming request is received by an overflow transaction, the overflow transaction process 800 at block 804 determines whether the incoming request matches a local address or an overflowed address. If it is a local address, then at block 810 the transaction is handled locally by the processor utilizing the local transaction cache.

However, if it is determined that it is an overflowed address, then at block 812 the XATT is walked by the XATT walker to ensure that it is indeed an overflowed transaction. Thus, at block 814 the XATT walker walks the XATT to determine a match. If no match is found, then at block 816 no conflict is declared, and at block 818 the requested transaction is performed. However, if there is a match, then the XATT walker either aborts its transaction or signals an abort to the conflicting transaction depending upon priority (block 820).

As previously discussed, as to committing overflowed transactions, the XATT walker first ensures that the XATT entries in the XPTR are updated. By updating the transaction header data structure, all corresponding entries in the XATT for all appropriate overflowed blocks will be atomically committed. Only when that is successful, the local hardware blocks buffered (and not overflowed) are committed. This two-operation commit ensures that local hardware commit and the overflowed software commit are synchronized.

Because overflows are relatively uncommon, the performance penalty of walking the XATT by the XATT walker is fairly minor. Also, process migrations, timer interrupts, and context switches can be handled by forcing all the locally buffered non-overflow blocks to be overflowed into the XATT.

With reference again to FIG. 1, a transaction address translation cache (XATC) 134 and a conflict detection filter (CDF) 136 may be utilized to improve efficiency and provide faster transaction translation and inter-transaction conflict management when utilized with transactional memory execution utilizing virtual memory, as previously discussed, according to embodiments of the invention.

In one embodiment, XATC 134 may be utilized to cache overflowed address translations to speed up the determination of translations. Particularly, the XATC 134 may cache part of the translation address translation table (XATT), such as the address or the XPTR. This is similar to the role that a translation look aside buffer (TLB) plays for a page table.

More particularly, when a processor transaction has overflowed, on executing an address, the processor looks to the XATC 134 to determine whether: 1) the address has been previously remapped, and 2) whether a new translation is necessary. Coherence actions are invoked on both the original, and the new physical addresses. The XATC 134 minimizes the need to walk to XATT. However, on a context switch, the XATC 134 is invalidated.

Further, the conflict detection filter (CDF) 136 may also be utilized to speed up the determination of whether an incoming request conflicts with an address or whether the requester will conflict with another transaction. The CDF 136 coarsely tracks addresses that have been overflowed. The CDF 136 also tracks addresses that belong to transactions that have been swapped out. Thus, the CDF 136 is common to all transactions, including swapped transactions. This is necessary because a swapped transaction is not an actively executing transaction and thus will not be able to determine for itself if a conflict occurs. The transaction generating the request will check against the CDF 136 to determine whether any swapped transaction has a remapped address in the XATT. By doing so, the need for walking the XATT every time a request is generated, may be eliminated.

One way to implement the CDF 136 is by extending the notion of a Bloom filter. The CDF 136 may be implemented as an array of counters, where the maximum counter value is the maximum number of transactions or locations that can overflow. To indicate an address is overflowed, $PA_{orig}$ is hashed with hashing functions $h_1, \ldots h_k$, and those counters in the CDF 136 are incremented. To remove the address, the same counters are decremented. To test whether an address is present, those counters are tested to determine if they are all non-zero, in which case a potential conflict has been detected.

Both the CDF 136 and the XATC 134 trade resources for performance: a large cache takes up resources but speeds up translation, while a large filter yields fewer false positives than a small filter. This flexibility means that the same structures can be deployed on both resource-rich and resource-poor platforms.

While embodiments of the present invention and its various functional components have been described in particular embodiments, it should be appreciated the embodiments of the present invention can be implemented in hardware, software, firmware, middleware or a combination thereof and utilized in systems, subsystems, components, or sub-components thereof. When implemented in software or firmware, the elements of the present invention are the instructions/code segments to perform the necessary tasks. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, bar codes, etc. The code segments may be downloaded via networks such as the Internet, Intranet, etc.

Further, while embodiments of the invention have been described with reference to illustrative embodiments, these descriptions are not intended to be construed in a limiting sense. Various modifications of the illustrative embodiments, as well as other embodiments of the invention, which are apparent to persons skilled in the art to which embodiments of the invention pertain, are deemed to lie within the spirit and scope of the invention.

What is claimed is:

1. An apparatus comprising: a processor including
   a local transactional cache;
   a resource manager, responsive to a transactional memory request, which is to reference an original address and is to be associated with a requesting thread, to determine whether the local transactional cache is capable of accommodating the transactional memory request, wherein the local transactional cache is utilized to perform the transactional memory request in response to the local transactional cache being capable of accommodating the transactional memory request;
   a transaction address walker to associate a new address, which is within an address space for the requesting thread, with the original address in an entry to be held in the address space for the requesting thread and to manage overflow of data associated with the transactional memory request from the original address to the new address in response to the local transactional cache not being capable of accommodating the transactional memory request; and a conflict detection filter (CDF) to indicate the original address has been overflowed in response to the local transactional cache not being capable of accommodating the transactional memory request, wherein the transaction address walker, in response to a subsequent transactional memory request to reference the original address, is not to access the entry to associate the new address with the original address based on the CDF indicating the original address has been overflowed.

2. The apparatus of claim 1, further comprising a transaction address table translation table (XATT) to be held in a portion of physical memory corresponding to the address space for the requesting thread, wherein the transaction address walker to associate the new address with the original address in the entry comprises the transaction address walker to initiate a store of at least the original address and the new address to an entry of the XATT.

3. The apparatus of claim 2, wherein the address space includes a virtual address space for the requesting thread, the original address includes a virtual address, and the new address includes a new virtual address within the virtual address space, and wherein the processor further includes address translation logic to translate the virtual address space to a physical address space including the portion of physical memory, to translate the original virtual address to an original physical address and to translate the new virtual address to a new physical address within the physical address space, the new physical address being different than the original physical address.

4. The apparatus of claim 3, wherein the transaction address walker is further to initiate a store to the entry of the original physical address, the new physical address, and a transaction action pointer (XPTR) to represent a state of a current transaction associated with the transactional memory request.

5. The apparatus of claim 4, wherein the state of a current transaction is selected from a group consisting of local, overflow, active, swapped, running, aborted, and committed.

6. The apparatus of claim 2, wherein the processor further comprises a translation buffer to cache at least a portion of the entry of the XATT.

7. The apparatus of claim 4, wherein responsive to an attempted commit of an overflowed transaction including the transactional memory request, the XATT walker checks the XPTR held in the entry of the XATT and in response to the XPTR of the XATT representing an abort state, the overflowed transaction is aborted.

8. The apparatus of claim 2, wherein the XATT is to hold entries for every overflowed transaction associated with the requesting thread, and wherein a second XATT is to hold entries for every overflowed transaction associated with a second thread.

9. A method comprising:
determining whether a cache resident within a processor is capable of accommodating a transactional memory request from a requesting thread associated with a virtual address space with a resource manager implemented inside the processor, the transactional memory request being associated with an original address;
performing the transactional memory request with the local cache in response to the resource manager determining the local cache is capable of accommodating the transactional memory request;
in response to the resource manager determining the local cache is not capable of accommodating the transactional memory request:

assigning a new address to the transactional memory request within an entry of a transaction address translation table (XATT), the new address and the XATT being within the virtual address space associated with the thread;
updating a conflict detection filter CDF to indicate the original address has been overflowed;
managing data for the transactional memory request utilizing the new address; and
determining a conflict without an access to the table based on the CDF indicating the original address has been overflowed in response to a subsequent access to the original address.

10. The method of claim 9, wherein a XATT walker within the processor is to assign the new address by operating on the XATT stored in physical memory associated with the virtual address space.

11. The method of claim 10, wherein assigning a new address includes assigning a new virtual address and a new physical address to the transactional memory request, wherein assigning the new virtual address and the new physical address to the transactional memory request includes updating an entry in the XATT stored in physical memory associated wit the virtual address space to hold the new virtual address, an original virtual address, the new physical address, and an original physical address.

12. The method of claim 11, further comprising assigning a state of a current transaction including the transactional memory request within the entry in the XATT.

13. The method of claim 12, wherein the state of a current transaction is one of local or overflow.

14. A machine-readable medium of a storage device having tangibly stored thereon instructions, which when executed by a machine, cause the machine to perform the following operations comprising:
determining whether a transactional memory store request referencing an original address for store data from a requesting thread associated with a virtual address space is to overflow a local memory within a processor;
performing the transactional memory transaction with the local memory in response to determining the transactional memory store request is not to overflow the local memory;
in response to determining the transactional memory store request is to overflow the local memory
assigning, within a table, a new address associated with the virtual address space to buffer the store data until an end of a transaction including the transactional memory store request,
updating a conflict detection filter CDF to indicate the original address has overflowed; and
determining a conflict without an access to the table based on the CDF indicating the original address has been overflowed in response to a subsequent access to the original address.

15. The machine-readable medium of claim 14, wherein assigning the new address associated with the virtual address space comprises a XATT walker within the processor to update an entry of a XATT table held in physical memory coupled to the processor to hold the new address and the original address.

16. The machine-readable medium of claim 15, wherein the original address includes an original virtual address and the new address includes a new virtual address within the virtual address space.

17. The machine-readable medium of claim 15, wherein the original address includes an original virtual address, when translated by a translation buffer in the processor, to reference an original physical address, and wherein the new address includes a new physical address, when translated by the translation buffer, to reference a new virtual address within the virtual address space.

18. The machine-readable medium of claim 17, wherein the entry of the XATT table is to hold the original virtual address, the new virtual address, the original physical address, the new physical address, and a state of a transaction including the transactional memory store request.

19. The machine-readable medium of claim 14, further comprising instructions to cause the machine to copy the store data from the new address to the original address in response to a commit of a transaction including the transactional memory store request.

20. The machine-readable medium of claim 14, further comprising instructions to cause the machine to discard the store data from the new address in response to an abort of a transaction including the transactional memory store request.

21. A computer system comprising:
a system memory to hold a transactional translation table within an application address space;
a processor coupled to the system memory, the processor including
a local cache;
a resource manager to determine whether the local cache is capable of accommodating a transactional memory request from a requesting thread of an associated application, which is to be associated with the application address space, the transactional memory request to reference an original address; and
a transactional translation table walker to initiate an update of an entry of the transactional translation table to hold a new address associated with the original address, the new address being within the application address space, wherein the new address is to hold overflow data associated with the transactional memory request; and
conflict detection logic to hold references to original addresses that have overflowed the local cache, and wherein a conflict from a subsequent transactional memory request is capable of being detected based on the references to the original addresses held in the conflict detection logic without the transactional translation table walker accessing the transactional translation table held within the system memory.

22. The computer system of claim 21, wherein the processor further includes translation logic to translate virtual addresses to physical address, and wherein the original address includes an original virtual address, when translated by the translation logic, to reference an original physical address, and the new address includes a new virtual address, when translated by the translation logic, to reference a new physical address of a physical memory location in the system memory within the application address space.

23. The computer system of claim 22, wherein the processor further includes a transaction translation cache to cache recently updated entries of the transactional translation table.

24. The computer system of claim 21, wherein the local cache includes a transactional cache separate from a data cache within the processor.

25. The computer system of claim 21, wherein the local cache includes data cache, which is also to be utilized as a transactional cache.

26. The computer system of claim 22, wherein the entry of the transactional table is to hold the original virtual address, the new virtual address, the original physical address, the new physical address, and a state of a transaction including the transactional memory request.

27. The computer system of claim 21, wherein the transactional translation table within the application address space is to only be associated with the single transaction including the transactional memory request.

28. The computer system of claim 21, wherein the transactional translation table within the application address space is to be associated with all transactions from the requesting thread of the associated application.

29. An apparatus comprising: a processor including
a local memory;
execution resources to execute a thread that includes a transaction having at least a transactional store operation to reference store data and an original virtual address for the store data, the thread to be associated with a virtual address space;
translation logic to translate virtual addresses within the virtual address space to physical addresses of physical memory to be associated with the processor;
overflow logic to determine if the transactional store operation, when received, is to overflow the local memory;
transaction logic to associate, within a table, a new virtual address, which is within the virtual address space to be associated with the thread, with the original virtual address in response to the overflow logic determining the transactional store operation is to overflow the local memory, wherein the new virtual address, when translated by the translation logic, is to reference a new physical address of the physical memory to hold the store data; and
conflict detection logic to track the original physical address in response to the overflow logic determining the transactional store operation is to overflow the local memory, and wherein, in response to a subsequent transactional memory request referencing the address, the transaction logic is capable of determining a conflict based on the original physical address tracked in the conflict detection logic without a lookout to the table.

30. The apparatus of claim 29, wherein the local memory includes a cache memory; the execution resources are capable of executing multiple threads, including the thread, at least partially in parallel; the original virtual address, when translated by the translation logic, is to reference an original physical address of the physical memory; and the physical memory includes a memory device to be coupled to the processor within a computer system.

31. The apparatus of claim 30, wherein the transaction logic to associate the new virtual address with the original virtual address comprises the transaction logic to initiate a write to a table to be held in the physical memory to update an entry of the table to hold the new virtual address and the original virtual address.

32. The apparatus of claim 31, wherein the processor further includes a transaction translation cache to cache at least a portion of the entry of the table in response to the transaction logic initiating the write to the table.

* * * * *